United States Patent Office 3,147,595
Patented Sept. 8, 1964

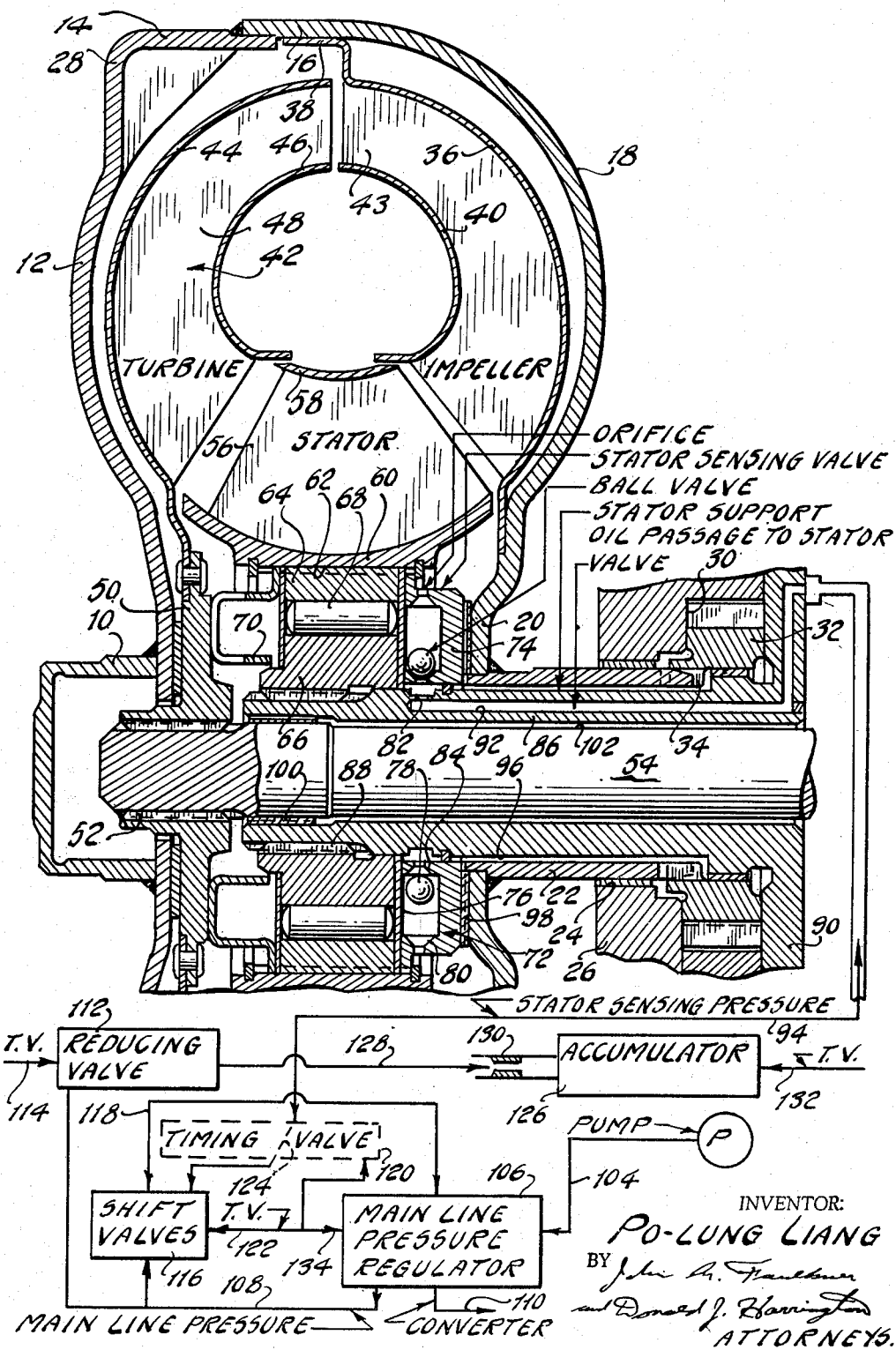

3,147,595
HYDROKINETIC POWER TRANSMISSION MECHANISM WITH STATOR SPEED SENSITIVE PRESSURE SIGNAL
Po-Lung Liang, Lincoln Park, Mich., assignor to Ford Motor Company, Dearborn, Mich., a corporation of Delaware
Filed Mar. 16, 1964, Ser. No. 352,288
4 Claims. (Cl. 60—54)

My invention relates generally to hydrokinetic power transmission systems, and more particularly to a hydrokinetic torque converter mechanism for use in an automotive vehicle driveline for delivering driving torque from an internal combustion vehicle engine to the vehicle traction wheels.

In an arrangement of this type it is common practice to provide multiple speed ratio gearing with the elements thereof being arranged in series with the hydrokinetic portions of the mechanism to establish torque delivery paths of varying torque ratio. The relative motion of the elements of the gearing is controlled by the clutch and brake means that may in turn be actuated by appropriate fluid pressure operated servos. An engine driven pump may be used to supply the servos with control pressure, and distribution of pressure to the servos can be established selectively by means of an automatic control valve system that responds to changes in operating variables. The valve system includes a main pressure regulator valve that maintains a pressure in the system that is sufficient to maintain the necessary torque transmitting capacity of the clutch and brake means under all driving conditions while at the same time preventing excessive pressure build-up in the servos. A typical valve system of this type is disclosed in Duffy Patent No. 3,095,755. Reference may be made to that patent for the purpose of supplementing this disclosure.

During initial acceleration from a standing start, the control system responds to an engine manifold pressure sensitive signal or to a driver operated torque demand valve arrangement to supply the regulator with a signal that will cause an increased regulated pressure level in the system when the engine torque and the hydrokinetic torque converter torque ratio are relatively high. When the torque requirements are reduced, however, a modification occurs in the signal and this in turn causes the regulator to respond by regulating at a lower value. The torque transmitting capacity of the clutch and brake means is reduced accordingly.

It is customary also for the regulator valve to respond to a driven shaft speed sensitive pressure signal so that for any given engine torque the regulated line pressure will decrease as the vehicle speed increases. The governor pressure signal and the torque demand pressure signal normally are applied to a shift valve system for controlling selectively the application and release of the servos for the clutch and brake means during speed ratio changes.

It is an object of my invention to provide a valve system with a main line pressure regulator that is sensitive to changing pressure requirements but which does not require a speed sensitive governor pressure signal or a torque demand sensitive pressure signal.

It is another object to include in a system of the type above set forth a shift valve control that does not require conventional signal pressures of the type employed in the Duffy system.

In accomplishing the foregoing objectives I have provided a stator speed sensing valve assembly that is drivably connected to the stator of a hydrokinetic torque converter mechanism in a vehicle driveline. During operation of the torque converter mechanism in the torque conversion range, the stator is held stationary by an over-running coupling so that it is effective to accommodate hydrokinetic torque reaction during torque multiplication. As the hydrokinetic torque ratio decreases to a value of approximately 1:1, the stator begins to freewheel in the direction of rotation of the impeller. At this time the hydrokinetic torque converter mechanism functions as a coupling in the usual fashion. The stator speed sensing valve assembly responds to stator rotation by developing a pressure signal that may be utilized by the shift valve arrangement as well as by the regulator valve system. Automatic speed ratio changes can be accomplished in this fashion without the necessity for employing a torque or torque demand pressure signal and without the need for a driven shaft governor valve arrangement.

It is another object of my invention to provide a torque converter mechanism having a stator speed sensitive valve assembly that responds to stator rotation and which is effective, therefore, to provide a precise indication of the coupling point during operation of the torque converter mechanism as the torque ratio becomes equal to unity. I contemplate that this signal can be utilized by the valve system to establish appropriate modifications in the circuit pressure and to initiate a speed ratio change in the gear system after the hydrokinetic torque multiplication fades out. During the acceleration period the entire torque multiplication range of the converter thus can be used to full advantage to augment the over-all torque ratio in each forward driving speed ratio.

Further objects and features of my invention will become apparent from the following description and from the accompanying drawing which shows in cross sectional form a hydrokinetic torque converter unit employing a stator speed sensing valve mechanism and a control valve system that responds to the signal made available by it.

In the drawing numeral 10 designates a hub for a first impeller shell part 12. This part is secured at its periphery 14 to the periphery 16 of a second shell part 18. The hub 20 of the shell part 18 is secured to a sleeve shaft 22 which is journaled by means of a bushing within an opening 24 formed in a portion 26 of the stationary transmission housing. The shell parts 12 and 18 cooperate to define a sealed impeller shell.

A shoulder 28 formed on the shell part 12 can be connected by means of a suitable drive plate to the crankshaft of an internal combustion vehicle engine, not shown.

Housing portion 26 is formed with a pump chamber 30 within which pump gear elements 32 are disposed. One of the elements 32 is keyed at 34 to the end of sleeve shaft 22 so that the pump defined by the elements 32 is capable of developing pressure whenever the vehicle engine crankshaft rotates.

The impeller assembly includes an outer impeller shroud 36, the outer margin of which is secured by spot welding to the inner surface of the shell part 18 as indicated at 38. An inner impeller shroud 40 and circumferentially spaced impeller blades 43 cooperate with shroud 36 to define radial outflow passages.

A turbine 42 situated within the impeller shell includes an outer shroud 44, an inner shroud 46 and flow directing blades 48. The blades 48 and the shrouds 44 and 46 cooperate to define radial inflow passages that are in fluid communication with the radial outflow passages of the impeller.

The inner hub of the shroud 44 is riveted to a turbine hub 50 which in turn is splined at 52 to a turbine shaft 54.

A stator is located between the flow exit region of the turbine and the flow entrance region of the impeller. It includes blades 56 situated between a first shroud 58 and a second shroud 60. Shroud 60 is defined by a hub having a central opening 62 within which is positioned outer race 64 of an overrunning brake assembly. The overrunning brake assembly includes also an inner race 66 and overrunning coupling elements in the form of rollers 68. One of the races may be cammed to cooperate with the rollers 68 and thereby inhibit rotation of the stator in a direction opposite the direction of rotation of the impeller although freewheeling motion in the opposite direction is accommodated.

A spacer 70 is located between hub 50 and the races 64 and 66. A speed sensor valve body 72 is located between the hub 20 of the shell part 18 and the races 64 and 66. Spacer 70 and the body 72 are keyed or splined at their outer peripheries to the shroud 60 and are situated within the opening 62.

The valve assembly 72 includes a valve body 74 having radial openings 76. If two such openings are used, they are spaced 180° out of phase with respect to each other. In each opening there is disposed a ball valve element 78, the diameter of which is chosen so that a substantial clearance exists between it and the surrounding wall in the opening 76.

The radially outward end of the opening 76 communicates with the interior of the torus cavity of the converter through a valve port 80. The radially inward end of the opening 76 communicates with a pressure supply passage 82 through a valve port 84. Passage 82 is formed in sleeve shaft 86 to which the inner overrunning brake race 66 is splined, the spline connection being identified by reference character 88. Sleeve shaft 86 in turn forms a part of an adapter 90 which is bolted or otherwise secured to the housing portion 26.

One or more passages 92 communicates with the passage 82 and hence with the opening 76 formed in the valve body 74. Passage 92 is supplied with pressurized fluid through passage 94.

A converter feed passage 96 may be defined by the annular space between sleeve 22 and shaft 86. This space may be supplied with fluid pressure made available by the impeller driven pump. The converter fluid supply to passage 96 passes transversely outwardly through radial grooves formed in a thrust washer 98 located between valve body 74 and the hub 20 of the shell part 18. The fluid then passes through the annular space between shroud 36 and the end of stator shroud 60 to the interior of the torus circuit. Fluid is returned from the torus circuit through the annular space between the shroud 44 and the other end of stator shroud 60. This flow passes radially inwardly through suitable openings formed in spacer 70 and through axial grooves formed in a bushing 100 located between stator sleeve shaft 86 and the turbine shaft 54. The fluid then passes through a flow return passage 102 which is defined by the annular space between shaft 54 and the sleeve shaft 86.

During the time that the torque converter mechanism is operating in the torque conversion range, the stator functions to change the magnitude of the tangential component of the absolute fluid flow velocity vector before the flow enters the entrance region of the impeller. Thus, the valve element 78 assumes a radially inward position and it is possible, therefore, for flow to pass from passage 92 through the opening 76 into the interior of the torus circuit. This supplements the normal converter feed. When the converter assembly assumes a coupling condition, however, the stator freewheels in the direction of rotation of the impeller in the usual fashion. This causes the valve element 78 to assume a radially outward position under the influence of centrifugal force. It then seals the port 80 thereby preventing flow of pressurized fluid from passage 92 through the opening 76. This causes a pressure build-up to occur in passage 92. I contemplate that this pressure build-up may be utilized as a pressure signal for initiating control functions in an automatic control valve system.

I have shown also in FIGURE 1 in schematic form a valve system capable of utilizing the signal thus produced. In FIGURE 1 the impeller driven pump is identified by the symbol P. It communicates with a transmission sump defined by the lower portion of the transmission housing. The discharge side of the pump P communicates with the high pressure passage 104 which applies fluid pressure to the main pressure regulator valve 106. This valve functions to maintain a predetermined operating pressure level in passage 108. It distributes also a regulated lower pressure to a converter feed passage 110 that communicates with passage 96.

The main line pressure passage 108 communicates with a pressure reducing valve 112 which in turn supplies low pressure fluid to passage 94. If desired, the regulating characteristics of the reducing valve 112 can be modified by a torque demand sensitive pressure signal that is distributed to valve 112 through the so-called throttle valve passage 114.

Shift valves 116 communicate with the main line pressure passage 108 and function to distribute pressure selectively to the fluid pressure operated servos for the clutch and brake means of the gear system, not shown. The speed ratio changes are controlled by the shift valves which respond to the pressure signal in passage 94, the latter communicating with the shift valves 116 through a branch passage 118. Thus, as the converter assumes a coupling condition following initial acceleration from a standing start, the signal that is obtained from the valve assembly 72 will initiate a speed ratio change in the gear system thereby establishing a higher speed ratio. If the gear system is of the type that produces two forward driving speed ratios, the power transmission mechanism will continue operating in the higher speed ratio as steady state driving conditions continue. I contemplate, however, that the upshift from a lower speed ratio to a higher speed ratio may be accompanied by a return of the hydrokinetic torque converter to the torque conversion range so that hydrokinetic torque multiplication will occur again during the final phase of the acceleration period. In this instance, the stator will cease rotating in the direction of rotation of the impeller and the valve elements 78 will become unseated. The pressure in passage 92 and in passage 94 then will return to a value equal to the magnitude of the static pressure in the torus region.

If the gear system employs three forward driving speed ratios, it is necessary during the acceleration period to obtain two speed ratio changes or upshifts. Under such conditions the pressure signal made available to passage 94 will be utilized by the shift valve assembly to initiate a second upshift. A second pressure signal is obtained, as previously explained, as the torque converter reaches its coupling point a second time following the resumption of the hydrokinetic torque conversion phase of the operation of the converter.

In order to distinguish the two signals that are created at separate times in the passage 94, I contemplate that an appropriate timing valve assembly 120 can be employed. This timing valve assembly can respond to a torque demand signal made available to it by passage 122 to distribute the first signal in passage 94 to one portion of the shift valve assembly during initial phases of an acceleration period and to distribute the second signal to another portion of the shift valve assembly during the final phases of the acceleration period. Under these conditions the appropriate clutch and brake servos can be energized to initiate each of the two speed ratio upshifts in a three speed ratio gear system.

In a two speed ratio gear system it may be possible to eliminate the timing valve and to substitute in its stead a direct connection between passage 94 and the shift valves 116. This direct connection is indicated schematically in the drawing by the dotted line pressure delivery passage 124.

If it is desired to delay the initiation of a speed ratio change after the torque converter coupling point is reached, an accumulator 126 may be used. This accumulator may include an expansible accumulator chamber that is in fluid communication with a passage 128 through a flow restricting orifice 130. Passage 128, in turn, communicates with the pressure signal passage 94. Thus, the build-up in the magnitude of the pressure signal in passage 94 can be delayed as the accumulator chamber carries out its accumulating function. The response of the shift valves 116 will be delayed until the accumulating function of the accumulator 126 is completed.

If desired, the accumulating characteristic of the accumulator 126 can be modified by subjecting it to a torque demand sensitive pressure signal through a throttle pressure passage 132. Throttle pressure also can be applied to the main pressure regulator valve, if desired, through a suitable passage 134, thereby causing the main line pressure to increase upon an increase in the engine torque demand or the engine torque itself.

Having thus described a preferred embodiment of my invention, what I claim and desire to secure by U.S. Letters Patent is:

1. A hydrokinetic power transmission mechanism comprising a bladed impeller, a bladed turbine and a bladed stator situated in toroidal fluid flow relationship, means for inhibiting rotation of said stator in one direction while accommodating freewheeling motion thereof in the opposite direction, a stator speed sensitive valve assembly connected to a movable portion of said stator, a source of pressure, and fluid pressure passage means interconnecting said pressure source and said valve assembly, said valve assembly responding to rotation of said stator to create a pressure signal in said passage means.

2. In a control system for a hydrokinetic power transmission mechanism comprising a bladed impeller, a bladed turbine and a bladed stator situated in toroidal fluid flow relationship, said stator being adapted to accommodate hydrokinetic torque reaction during operation of said mechanism in a torque conversion range and to freewheel in the direction of rotation of said impeller during operation in a coupling range, a fluid pressure source, valve means connected to said stator for sensing the speed of rotation of said stator and producing a pressure signal, and passage means communicating with said valve means for distributing pressure thereto from said source and for distributing said signal to speed sensitive portions of said system.

3. A hydrokinetic power transmission mechanism comprising a bladed impeller, a bladed turbine and a bladed stator situated in toroidal fluid flow relationship, means for inhibiting rotation of said stator in one direction while accommodating freewheeling motion thereof in the opposite direction, a stator speed sensitive valve assembly connected to a movable portion of said stator, a source of pressure, fluid pressure passage means interconnecting said pressure source and said valve assembly, said valve assembly responding to rotation of said stator to create a pressure signal in said passage means, said valve means comprising a valve body connected to said stator, a radial opening formed in said valve body, a valve element mounted within said valve opening, a valve port formed at a radially outward portion of said valve chamber, said passage means communicating with said valve port whereby the pressure in the passage means is equal to the pressure in said torus circuit when said stator is stationary, said valve element being urged under the influence of centrifugal force into sealing engagement with said valve port thereby interrupting communication between said passage means and said torus circuit when said stator is rotating.

4. In a control system for a hydrokinetic power transmission mechanism comprising a bladed impeller, a bladed turbine and a bladed stator situated in toroidal fluid flow relationship, said stator being adapted to accommodate hydrokinetic torque reaction during operation of said mechanism in a torque conversion range and to freewheel in the direction of rotation of said impeller during operation in a coupling range, a fluid pressure source, valve means connected to said stator for sensing the speed of rotation of said stator and producing a pressure signal, passage means communicating with said valve means for distributing pressure thereto from said source and for distributing said signal to speed sensitive portions of said system, said valve means comprising a valve body connected to said stator, a radial opening formed in said valve body, a valve element mounted within said valve opening, a valve port formed at a radially outward portion of said valve chamber, said passage means communicating with said valve port whereby the pressure in the passage means is equal to the pressure in said torus circuit when said stator is stationary, said valve element being urged under the influence of centrifugal force into sealing engagement with said valve port thereby interrupting communication between said passage means and said torus circuit when said stator is rotating.

No references cited.